United States Patent
Inomata et al.

(10) Patent No.: US 11,797,556 B2
(45) Date of Patent: Oct. 24, 2023

(54) DATABASE MANAGEMENT SERVICE PROVISION SYSTEM

(71) Applicant: Hitachi, Ltd., Tokyo (JP)

(72) Inventors: Hirofumi Inomata, Tokyo (JP); Masafumi Kinoshita, Tokyo (JP); Hiroaki Konoura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 251 days.

(21) Appl. No.: 17/420,075

(22) PCT Filed: Dec. 18, 2019

(86) PCT No.: PCT/JP2019/049536
§ 371 (c)(1),
(2) Date: Jan. 10, 2022

(87) PCT Pub. No.: WO2020/153053
PCT Pub. Date: Jul. 30, 2020

(65) Prior Publication Data
US 2022/0129473 A1 Apr. 28, 2022

(30) Foreign Application Priority Data

Jan. 23, 2019 (JP) ................. 2019-009349

(51) Int. Cl.
*G06F 16/00* (2019.01)
*G06F 16/25* (2019.01)
(Continued)

(52) U.S. Cl.
CPC ...... *G06F 16/252* (2019.01); *G06F 16/24561* (2019.01); *G06F 16/27* (2019.01); *H04L 67/1095* (2013.01)

(58) Field of Classification Search
CPC .. G06F 16/252; G06F 16/24561; G06F 16/27; G06F 16/23; H04L 67/1095
See application file for complete search history.

(56) References Cited

U.S. PATENT DOCUMENTS 6,044,374 A    3/2000   Nesamoney et al.
7,991,791 B1 * 8/2011   Chen .................. G06F 11/1435
                                                 707/787
(Continued)

FOREIGN PATENT DOCUMENTS

JP    2005-275937 A    10/2005
JP    2005-276094 A    10/2005
(Continued)

OTHER PUBLICATIONS

Korean-language Office Action issued in Korean Application No. 10-2021-7015530 dated Apr. 9, 2023 with English translation (12 pages).
(Continued)

*Primary Examiner* — Alexander Khong
(74) *Attorney, Agent, or Firm* — Crowell & Moring LLP

(57) ABSTRACT

Each of a plurality of servers includes a shared information storage region for storing information to be shared with other servers. The servers operate so as to match data of the shared information storage regions with each other. A first server manages a first local database. A second server generates query information for accessing the first local database, and stores the query information in the shared information storage region of the second server. The first server acquires the query information from the shared information storage region of the first server, and stores the result with respect to the query information in the shared information storage region of the first server. The second server acquires the result from the shared information storage region of the second server.

9 Claims, 16 Drawing Sheets

(51) Int. Cl.
*G06F 16/27* (2019.01)
*G06F 16/2455* (2019.01)
*H04L 67/1095* (2022.01)

(56) References Cited

U.S. PATENT DOCUMENTS

| | | | |
|---|---|---|---|
| 8,683,566 B1* | 3/2014 | Gailloux | G06F 21/34 726/4 |
| 9,870,562 B2 | 1/2018 | Davis et al. | |
| 2003/0172090 A1* | 9/2003 | Asunmaa | H04L 63/06 |
| 2005/0114367 A1* | 5/2005 | Serebrennikov | G06F 16/951 707/E17.115 |
| 2005/0216473 A1 | 9/2005 | Aoyagi et al. | |
| 2005/0216523 A1 | 9/2005 | Sakaguchi et al. | |
| 2014/0047263 A1* | 2/2014 | Coatney | G06F 11/2092 711/119 |
| 2017/0118262 A1* | 4/2017 | Patel | H04L 51/224 |
| 2017/0126626 A1* | 5/2017 | Datta | H04L 63/0272 |
| 2017/0331782 A1* | 11/2017 | Lai | H04L 61/3025 |

FOREIGN PATENT DOCUMENTS

| | | |
|---|---|---|
| JP | 2007-219634 A | 8/2007 |
| JP | 2011-159106 A | 8/2011 |
| JP | 2018-190227 A | 11/2018 |
| KR | 10-2002-0096728 A | 12/2002 |
| KR | 10-2013-0038517 A | 4/2013 |

OTHER PUBLICATIONS

International Search Report (PCT/ISA/210) issued in PCT Application No. PCT/JP2019/049536 dated Mar. 3, 2020 with English translation (five (5) pages).

Japanese-language Written Opinion (PCT/ISA/237) issued in PCT Application No. PCT/JP2019/049536 dated Mar. 3, 2020 (three (3) pages).

* cited by examiner

# DATABASE MANAGEMENT SERVICE PROVISION SYSTEM

CLAIM OF PRIORITY

The present application claims priority from Japanese patent application No. 2019-9349 filed on Jan. 23, 2019, the content of which is hereby incorporated by reference into this application.

BACKGROUND OF THE INVENTION

This invention relates to a database management service provision system.

For any size of enterprises, speedy and flexible construction of a supply chain has become an issue to achieve globalization and enhancement of their business. The partner enterprises in a supply chain (including an electronic data interchange system) have recognized the importance of speedily sharing information (including information about the interrelationship of information provided by the partner enterprises) through an IT infrastructure. Such a supply chain unitarily manages information about joining or leaving of a partner enterprise (a member of an enterprise consortium) with an IT system utilizing a database management system (DBMS). For an enterprise to join this supply chain, procedures to approve the participation, system construction to connect to the IT system of each partner enterprise, and test communication take time, hindering improvement of business agility. In the following description, the term "partner enterprise" is also referred to as partner.

Meanwhile, a technology called distributed ledger technology (or blockchain technology) has emerged that does not require unitary management (or centralized management) for information sharing. This technology is a kind of database replication technology so that loosely coupled IT systems in a network can have clones of their information with one another, although it is not so advantageous in handling large data. In the following description, this blockchain technology is shortened to BC technology and blockchain to BC.

In view of the foregoing background, it is expected that the needs for enhancement of corporate governance of partners and improvement of agility increase. This invention targets a system for providing a service of a database management system to improve the agility in information sharing (e.g., information banking and information linking/associating) among the partners belonging to a supply chain. The following description explains an example of a supply chain, but the term "supply chain" can be read as a group of enterprises that share information.

U.S. Pat. No. 6,044,374 B discloses a mechanism for unitarily managing metadata of information (contents such as files) stored in separate locations to share the contents. JP 2018-190227 A discloses a mechanism for storing files in one or more separate file servers without duplication by sharing metadata (such as information on storage locations of the files) using BC technology. U.S. Pat. No. 9,870,562 B discloses an example of an IT system for performing business transactions using BC technology.

Patent Literature 1: U.S. Pat. No. 6,044,374 B
Patent Literature 2: JP 2018-190227 A
Patent Literature 3: U.S. Pat. No. 9,870,562 B

SUMMARY OF THE INVENTION

Taking an example of a supply chain, the demand for improvement of business agility will increase as applied business expands. A supply chain unitarily manages various non-routine works and approvals of joining and leaving of partner enterprises. As a result, joining/leaving of a partner enterprise cannot be easily pursued in unit of enterprise group consisting of a part of the supply chain; the procedure therefor tends to take time. Accordingly, in order to share information through an IT infrastructure, demanded first is that partner enterprises speedily and flexibly share database management system (DBMS) management information so that various applications scattered across a large number of enterprises can use the DBMSs and databases (DBs) held by the partner enterprises.

Meanwhile, information (a content) shared by a plurality of partners can be smoothly accessed from anywhere via the Internet because of the recent improvement in communication performance, even if the information is stored in a local database of a server connected with the Internet. However, the procedure to acquire management information required to access the local database from another server and the works to construct an IT system to enable such an access hinder the improvement of agility.

An aspect of this invention is a database management service provision system including: a plurality of servers; and one or more databases. The plurality of servers include: a first server; and a second server. Each of the plurality of servers includes a shared information storage area configured to store information to be shared with other servers. Each of the plurality of servers is configured to operate to have identical data in the shared information storage area. The first server is configured to manage a first local database. The second server is configured to: generate query information to access the first local database; and store the query information to the shared information storage area of the second server. The first server is configured to: acquire the query information from the shared information storage area of the first server; and store a response to the query information to the shared information storage area of the first server. The second server is configured to acquire the response from the shared information storage area of the second server.

An aspect of this invention enables processing for using a database to be performed efficiently.

DETAILED DESCRIPTION OF THE EMBODIMENTS

Figure 1:
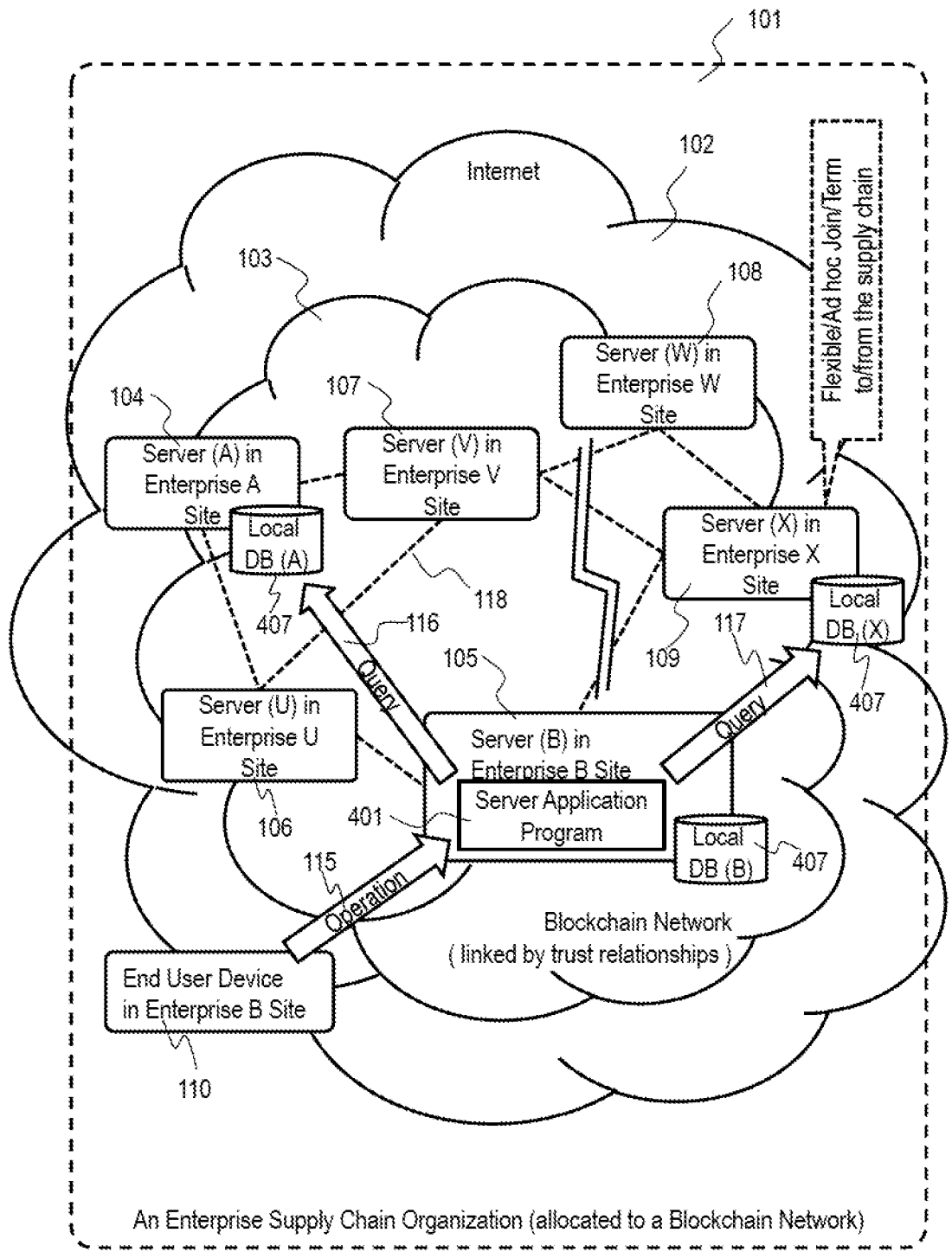
FIG. 1 illustrates an overall configuration of a network.

The overview of the embodiments for carrying out this invention is described. The embodiments provide techniques related to the IT infrastructure and the database management system to attain information sharing among enterprises, for example. The systems and the methods in the embodiments are suitable especially for a distributed database management system used for management of an enterprise consortium (e.g., a supply chain) and information sharing among the enterprises belonging to the enterprise consortium.

Each partner of the enterprise consortium stores information (inclusive of relatively large information) to be shared to a database with a database management system (DBMS) program in its own server. On this occasion, the partner that stores the information shares configuration information and management information required for the other partners to use/execute their DBMS programs using blockchain (BC) technology. As a result, a partner participating in the blockchain network (the group that shares information by BC technology) can access the local databases of the other partners through the DBMS programs in the other partners' servers.

Embodiments for carrying out this invention will be described based on embodiments with reference to the drawings. Hereinafter, the embodiments are described in detail with the configuration and operation flow of each element. The embodiments can use a known blockchain platform with respect to the internal operation and specifications of the blockchain (BC) service program for implementing a blockchain network.

Examples of the known blockchain platform include blockchain platforms opened to the public as open source software (OSS) as well as the example disclosed in the aforementioned JP 2018-190227 A. The OSS platforms include Hyperledger Fabric, Ethereum, Quorum, Bitcore, and LISK.

Although these blockchain platforms are different in the function names for invoking functions, the embodiments can use the functions provided in any of these blockchain platforms. Accordingly, detailed description about the internal operation of the BC service program for implementing a blockchain network is omitted in the following description.

The blockchain technology employed in the above-described blockchain platform is described briefly. There are some known ways for a plurality of servers connected to a communication network to share data. One of such ways is centralized sharing, in which a specific server holds the data to be shared and the other servers access data in the specific server to share the data. However, when large data to be shared by applications scattered across a large number of enterprises is stored in a specific local database, accessing the data is limited by the performance of the IT infrastructures (such as servers, data storages, and networks) of individual enterprises.

Another way is distributed sharing, in which a plurality of servers to share data interactively store clones of the data. This distributed sharing enables an update of data in each server with low load but is difficult to guarantee the authenticity of data.

Blockchain technology is a data sharing technology employing the latter distributed sharing. To guarantee the authenticity of data to be shared, blockchain technology makes servers share not only updated data but also history of the data before the update and further, attaches a digital signature of the server or the user that updates the data. Through this configuration, blockchain technology prevents tampering by a third party and facilitates detection of tampering. Blockchain technology achieves data sharing with lower load than the centralized sharing and further, provides reliability as high as the centralized sharing.

Embodiment 1

Figure 2:
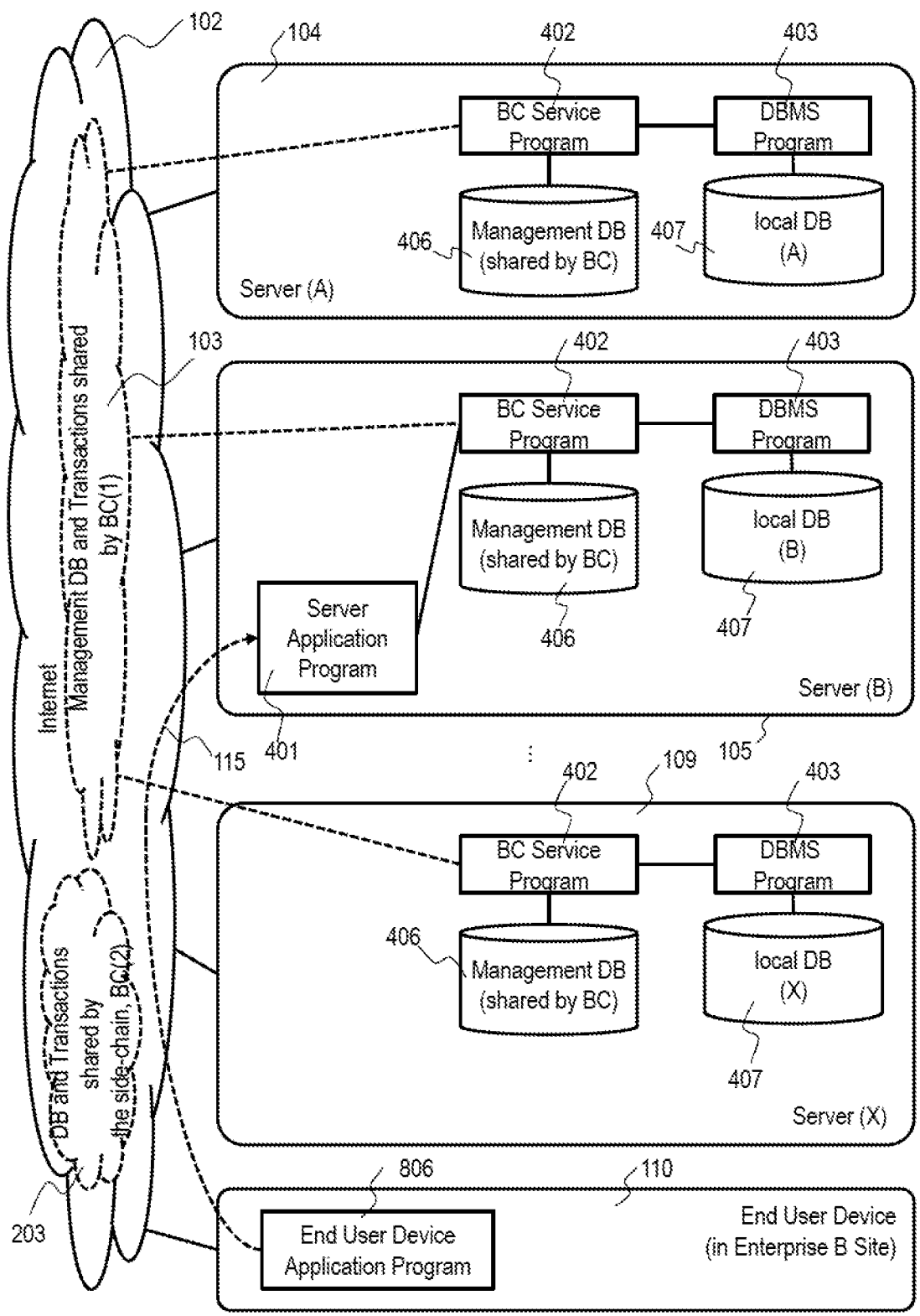
FIG. 2 illustrates a configuration of a system.

With reference to FIGS. 1 and 2, the configuration of a database management service provision system for implementing this embodiment is described. FIG. 1 illustrates a network configuration of this system. Servers 104, 105, 106, 107, 108, and 109 owned by one or more enterprises belonging to a supply chain 101 and an end user device 110 connect to the Internet 102 and communicate with one another via the Internet 102.

The servers 104, 105, 106, 107, 108, and 109 owned by one or more enterprises belonging to the supply chain 101 further connect to a blockchain network 103 and communicate with one another via the blockchain network 103. In the example in FIG. 1, the Internet 102 includes the blockchain network 103. Each of the servers 104, 105, 106, 107, 108, and 109 has a local database (DB) 407. However, FIG. 1 shows only the local DBs of the servers 104, 105, and 109 that are necessary to explain the processing. The server 105 has a server application program 401.

A plurality of dashed lines 118 schematically represent trust relationships between servers in the blockchain network 103. The servers connected by a dashed line 118 have a trust relationship. The blockchain platform (provided by BC service programs 402 in FIG. 2) transmits communication of a BC transaction on the blockchain network 103 by chaining data exchanges between servers having a trust relationship represented by a dashed line 118.

Under the above-described network configuration, assume that an enterprise X participates in the supply chain 101 and because of it, its server 109 joins the blockchain network 103. Thereafter, the server application program 401 of the server 105 receives an operation from the end user device 110 via the Internet 102, for example. The server application program 401 sends a query to the server 104 or 109 in order to acquire data necessary for its processing from the local DB 407 in the server 104 or 109.

FIG. 2 illustrates a logical configuration referred to in the following description of the operation. The Internet 102 includes blockchain networks 103 and 203; the servers 104, 105, and 109 and the end user device 110 connect to the Internet 102. The servers 104, 105 and 109 connect to the blockchain network 103. None of the servers in FIG. 2 connects to the blockchain network 203.

Each of the servers 104, 105 and 109 has a BC service program 402, a DBMS program 403, a management DB 406, and a local DB 407. Furthermore, the server 105 has one or more server application programs 401. The server 105 can have a plurality of server application programs for different local DBs.

The end user device 110 has an end user device application program 806. The end user device application program 806 instructs a server application program 401 to perform an operation 115 via the Internet 102. In this example, the operation 115 is an access to the designated database.

The BC service program 402 is a program module for implementing a blockchain platform. Generally, this module is software opened to the public as OSS and in this embodiment, uses common functions. Accordingly, description of its internal operation is omitted in the following detailed description. This embodiment mainly uses common functions such as BC transaction communication and data replication (cloning) among a plurality of servers.

A BC transaction is a transaction through a blockchain network. On the blockchain platform, data to be shared by servers is replicated. That is to say, the servers operate so that the data stored in their shared information storage areas will become identical. In this embodiment, the data in the management DBs 406 to be described later is replicated and the servers operate (communicate) so that their management DBs 406 will become identical. Each management DB 406 (the storage area thereof) is an example of a shared information storage area.

The DBMS program 403 is a program module obtained by incorporating a function for connecting to a blockchain network into a program for implementing a common database management system (DBMS). The query processing function provided by the database management system is commonly known and detailed description thereof is omitted in the following detailed description. This embodiment can use a database management system employing SQL database language defined by ISO standard.

This embodiment can also use a program module for implementing data storage that does not employ SQL database language, such as a key-value storage, an object storage, or a web server, as the DBMS program 403.

The management DB 406 is a database or a storage for storing configuration information and management information required to execute the DBMS program 403. The configuration information is information required to start the DBMS program 403 and the management information is data to be referred to by the DBMS program 403 to manage the local DB 407. The data held in the management DB 406 is replicated and stored to the management DBs 406 of the other servers through the BC service program 402.

The local DB 407 is a storage for holding a database managed by the DBMS program 403. The end user device application program 806 is a program module for operating the server application program 403 via the Internet 102.

Hereinafter, constituent elements of this system will be described with reference to FIGS. 3 to 9. For simplicity of explanation, it is assumed that the one or more servers 104, 105, 106, 107, 108, and 109 have the identical internal configuration. Each server does not have to include a constituent element not to be used.

Figure 3:
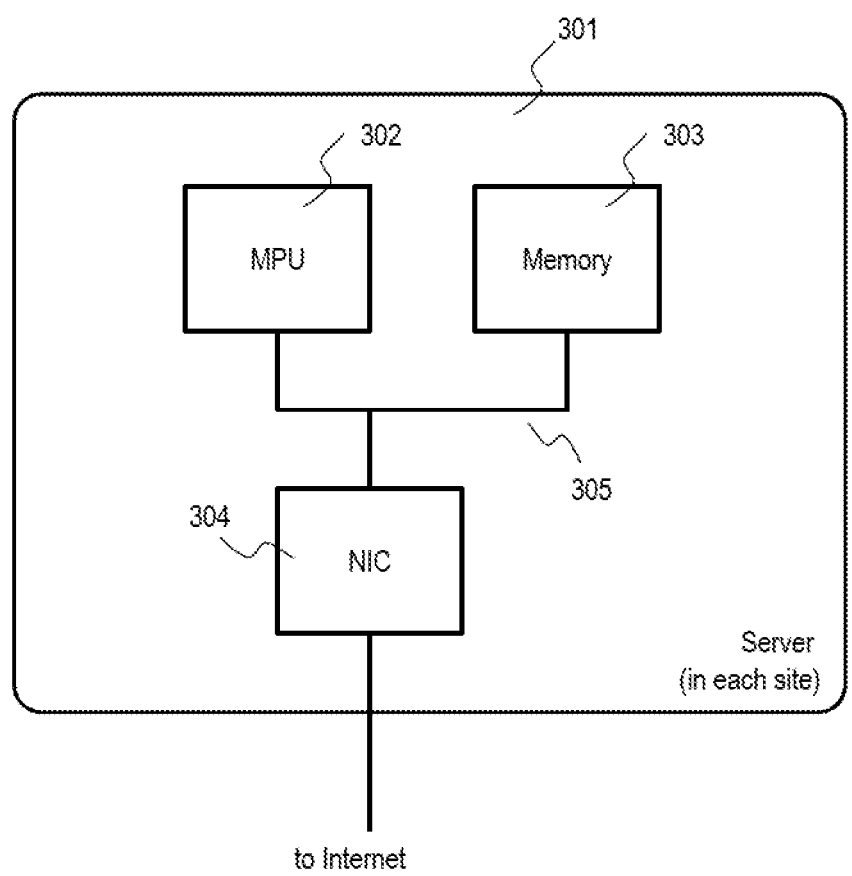
FIG. 3 illustrates an internal configuration of a server.
Figure 4:
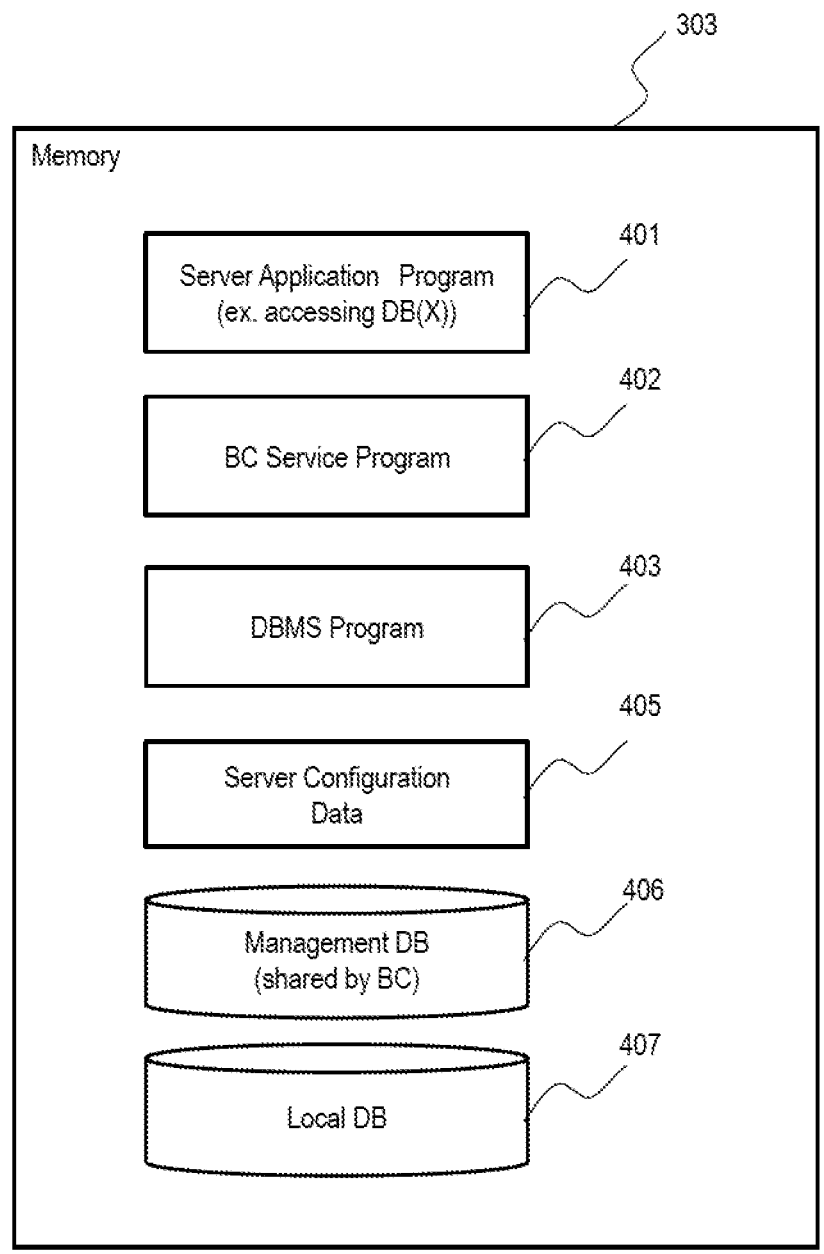
FIG. 4 illustrates a memory configuration of a server.

FIG. 3 illustrates the internal hardware configuration of the aforementioned one or more servers, using a server 301 in the drawing as an example. The server 301 includes an MPU 302, a memory 303, an NIC 304 for connecting to the Internet 102, and a data bus 305 connecting these components. The MPU 302 is a microprocessor unit and an example of a processor. The memory 303 is a primary memory and an example of a storage device. The NIC 304 is a network interface card for connecting to the Internet 102. FIG. 4 illustrates data configuration in the memory 303 of the server 301. The memory 303 includes a server application program 401, a BC service program 402, a DBMS program 403, server configuration data 405, a management DB 406, and a local DB 407.

The server application program 401 is a program module for implementing a business application to be used by an end user. The BC service program 402 is a program module for implementing a blockchain platform.

The DBMS program 403 is a program module for implementing a database management system participating in a blockchain network. Operation of each program module will be described later with operation flows.

The server configuration data 405 is a data storage area for holding configuration information and management information unique to the server 301. The management DB 406 is a data storage area for holding configuration information and management information required to execute the DBMS program 403. The management information required to use the DBMS program 403 is generally different depending on the specifications of the employed DBMS program 403 but includes information common to various DBMS programs.

Examples of the common information include the data source names and the database name of the local DB 407 managed by the DBMS program 403 and the database table names held by the local DB 407; the management DB 406 can hold all or part of these. Examples of the common management information include user account information listing users allowed to use the DBMS program 403 and their authorized actions. The management DB 406 can hold all or part of these.

These configuration information and management information are information required to use the DBMS program 403 but optional to implement this embodiment; description about the internal processing of the DBMS program 403 on these is omitted here.

The local DB 407 is a data storage area for storing a database to be used by the server application program 401 through the DBMS program 403. The management DB 406 and the local DB 407 can be stored in an external storage device.

Figure 5:
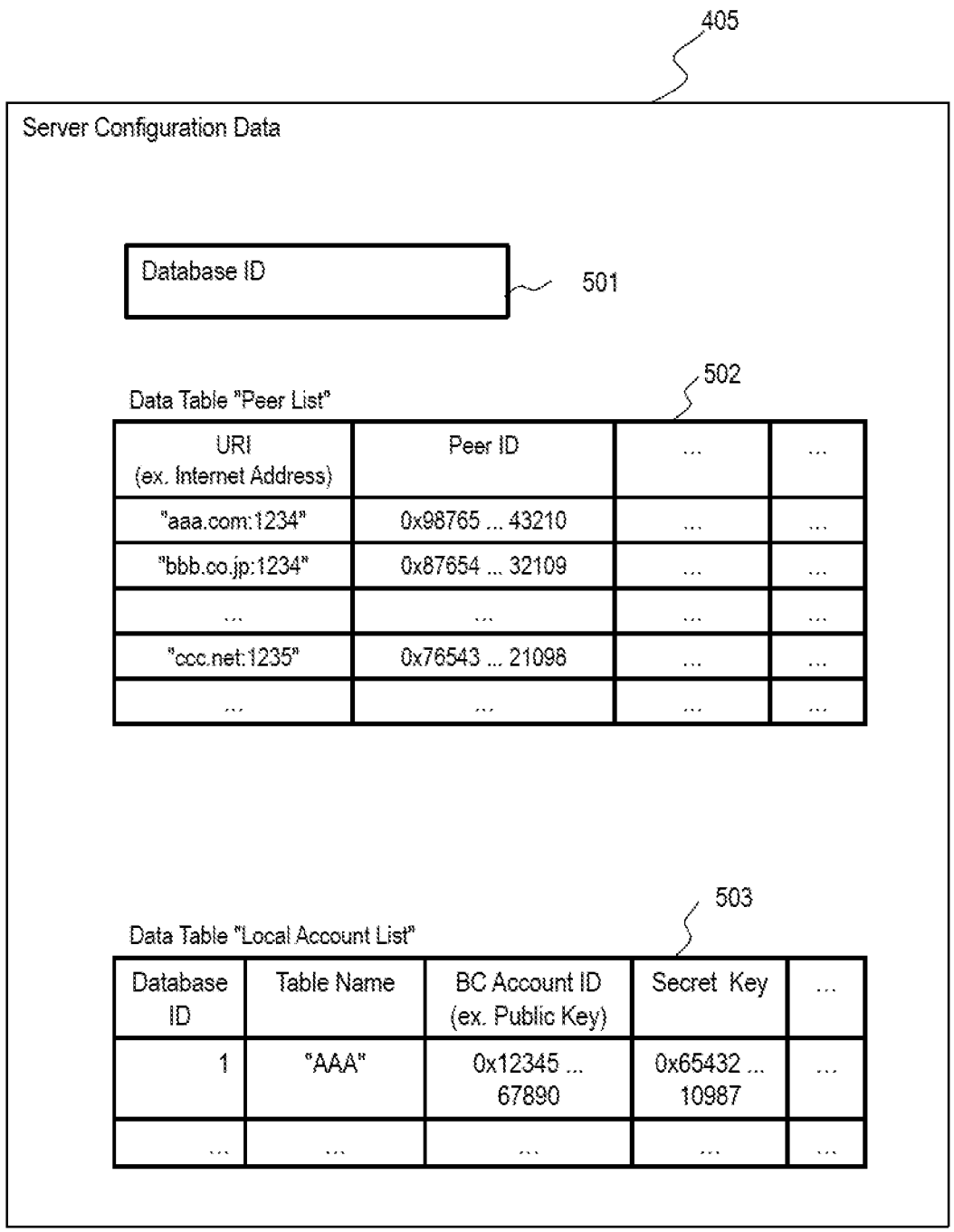
FIG. 5 illustrates a configuration of server configuration data.

FIG. 5 illustrates the internal configuration of the server configuration data 405. The server configuration data 405 includes a database ID 501, a data table "peer list" 502, and a data table "local account list" 503.

The database ID 501 is a data storage area for storing the identification information for identifying the local DB of the server 301. According to the example of FIG. 5, the server has one local DB; however, but the server can have a plurality of local DBs. This identifier is information unique to the system, such as a serial number or the Internet address of the server.

The data table "peer list" 502 is a list of servers (nodes) with which the server 301 has a trust relationship 118 or a list of other servers with which the server 301 communicates. The updated information to be shared in the blockchain network is sent to all servers indicated in the data table "peer list" 502. In accordance with the peer list 502, all servers in the blockchain network can share information through peer-to-peer communication having a trust relationship.

The data table "peer list" 502 is a data table having a column "URI" and a column "peer ID". The column "URI" in each record can include the Internet address of a server (server having a trust relationship 118) with which the BC service program 402 of the server 301 can directly communicate. The column "peer ID" of each record includes identification information of the server in the blockchain network. Generally, this server identification information is a public key uniquely generated for the server in accordance with the public-key encryption scheme employed by the blockchain platform.

The data table "local account list" 503 is a list of tables managed by the server 301. Each record in the data table "local account list" 503 has a column "database ID", a column "table name", a column "BC account ID", and a column "secret key". The column "database ID" stores the database ID in the server holding the database table of a local database.

The column "table name" stores the name of the database table. The column "BC account ID" stores identification information (public key) of the server in the blockchain network. The column "secret key" stores a secret key for the server identification information in the blockchain network.

Figure 6:
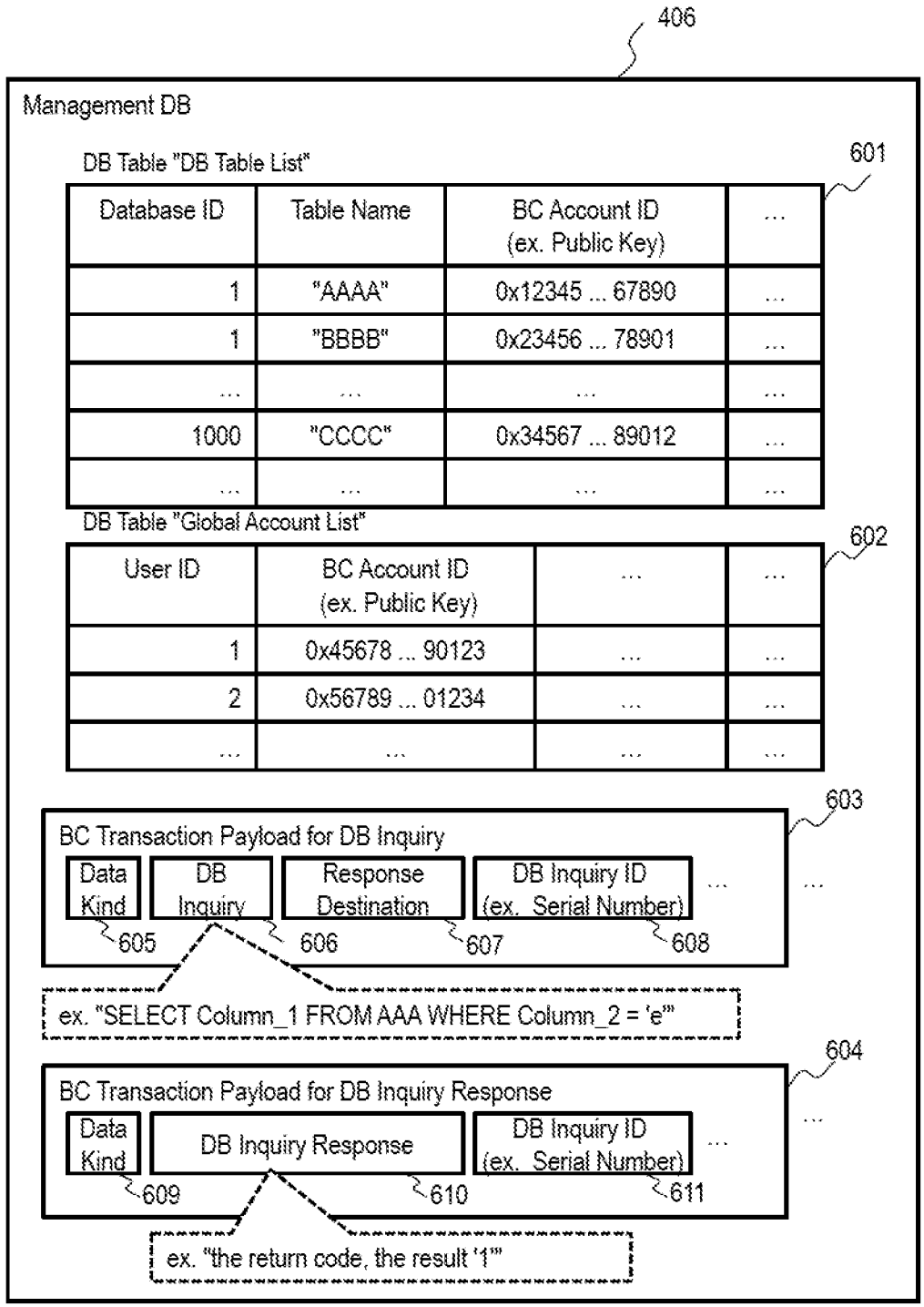
FIG. 6 illustrates a configuration of a management database.

FIG. 6 illustrates the data configuration of the management DB 406. The management DB 406 is information to be shared by the servers in the blockchain network. An update of the management DB 406 in one of the servers is reflected to all servers in the blockchain network.

The management DB 406 includes a DB table "DB table list" 601, a DB table "global account list" 602, data storage areas "BC transaction payload for DB inquiry" (query storage areas) 603, and data storage areas "BC transaction payload for DB inquiry response" (query response storage areas) 604.

The DB table "DB table list" 601 is information about databases managed by the servers in the blockchain network and in this example, a list of all tables in the blockchain network. This list enables a server in the blockchain network to generate query information for any server. The DB table "DB table list" 601 has a column "database ID", a column "table name", and a column "BC account ID".

The DB table "global account list" 602 is a list of all end users expected to connect to the blockchain network. The DB table "global account list" 602 has a column "user ID" and a column "BC account ID".

In each record, the column "user ID" stores identification information of an end user. This identification information can be a character string or numerical value unique to the BC network. The column "BC account ID" stores identification information in the blockchain network assigned to the end user, which can be a public key, like server identification information.

Each data storage area "BC transaction payload for DB inquiry" (query storage area) 603 stores query information to be sent to the DBMS program 403 of another server via the blockchain network. The query information is updated when new query information is generated.

The data storage area "BC transaction payload for DB inquiry" 603 includes a data field "data kind" (information on the kind of data) 605, a data field "DB inquiry" (query information) 606, a data field "response destination" (the addressee of the response) 607, and a data field "DB inquiry ID" (identification information on the query) 608.

The data field "data kind" (information on the kind of data) 605 stores identification information for identifying the kind of data in the BC transaction payload. In a case of a BC transaction of a query, identification information representing query is stored.

The data field "DB inquiry" (query information) 606 stores query information to be sent to the DBMS program 403. In an example of a search using SQL, it stores a character string such as "SELECT Column_1 FROM AAA WHERE Column_2='e'". This means that the value of the column "Column_1" of the record including a value "e" in the column "Column_2" is to be acquired from the DB table "AAA". As noted from this example, the data field "DB inquiry" 606 designates the table to be accessed.

The data field "response destination" (the addressee of the response) 607 stores the addressee of the response to the query executed by the DBMS program 403. This response destination can be the BC account ID or the URI (the Internet address) of the server. The data field "response destination" 607 is information on the destination of the result of the query. As will be described later, the response destination 607 is referred to when the DBMS program 403 changes the addressee of the response directly (not through the BC service program 402) to the server that has sent the query. The data field "DB inquiry ID" (identification information on a query" 608 is identification information for identifying the query and can be a unique serial number or identification information of the transaction in the blockchain.

Each data storage area "BC transaction payload for DB inquiry response" (query response storage area) 604 stores information on the response to query information sent to another server. In the case of a search result, this response information can be a character string "the return code, the result '1'".

The data storage area "BC transaction payload for DB inquiry response" (query response storage area) 604 has a data field "data kind" (information on the kind of data) 609, a data field "DB inquiry response" (query response information) 610, a data field "DB inquiry ID" (identification information on a query) 611.

The data field "data kind" (information on the kind of data) 609 stores identification information for identifying the kind of the query response. The data field "DB inquiry response" (query response information) 610 stores response information from the DBMS program 403 that has executed a query. The data field "DB inquiry ID" (identification information on a query" 611 stores the DB inquiry ID of the query executed by the DBMS program 403 (the value stored in the DB inquiry ID 608) so that the sender of the query can identify the query response to the query sent from the sender.

Although this embodiment is described assuming that the DB inquiry IDs 608 and 611 are serial numbers for identifying queries, the DB inquiry IDs 608 and 611 can be unique identification information, such as identification information on BC transactions managed within the BC service program 402. For example, the identification information can be acquired in sending a BC transaction using geth commands provided by a blockchain platform Ethereum.

Since the DBMS program to receive a BC transaction acquires this identification information, the DBMS program can include the information in the response. The sender compares the identification information acquired from the geth system with the identification information included in the response to determine the response is the response to the BC transaction the sender has sent.

Figure 7:
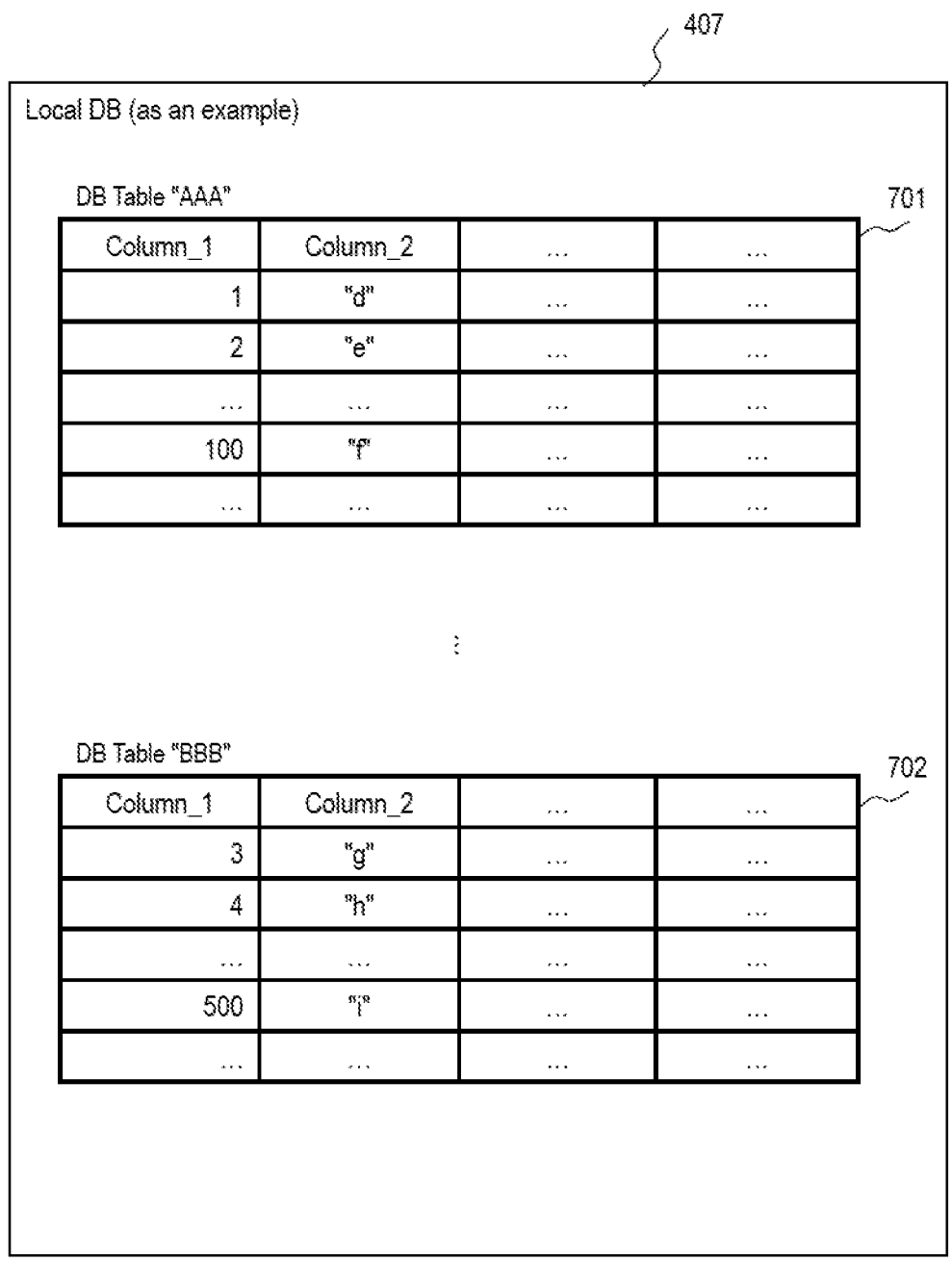
FIG. 7 illustrates a configuration example of a local database.

FIG. 7 illustrates the data configuration of the local DB 407. The local DB 407 in FIG. 7 shows examples of database tables to be used by the server application program as an example to explain the operation. Since the specifics of the server application program depend on the end user or the supply chain, the local DB 407 can have different database tables suitable for different server application programs.

The local DB 407 includes a DB table "AAA" 701 and a DB table "BBB" 702, for example. The records of the DB table "AAA" 701 have a column "Column_1" and a column "Column_2". The records of the DB table "BBB" 702 have a column "Column_1" and a column "Column_2".

Figures 8, 9:
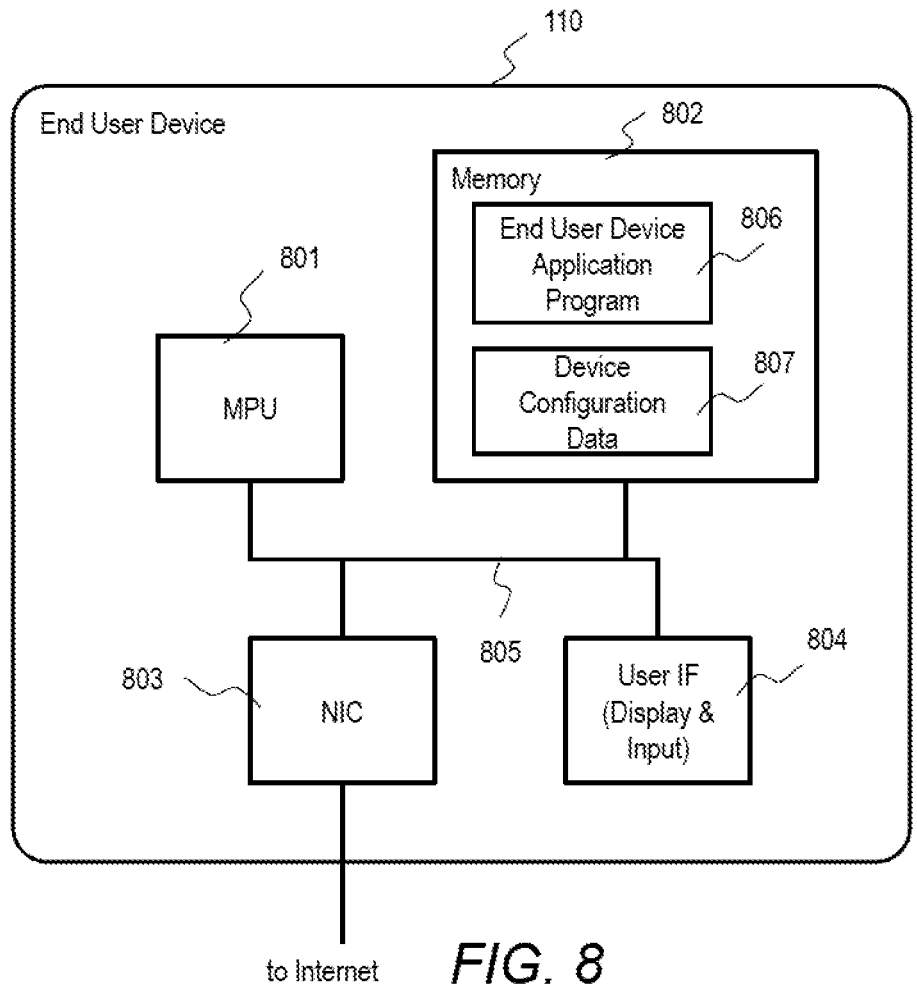
FIG. 8 illustrates an internal configuration of an end user device.
FIG. 9 illustrates a configuration of device configuration data.

FIG. 8 illustrates an example of the internal configuration of the end user device 110. The end user device 110 includes an MPU 801, a memory 802, an NIC 803 for connecting to the Internet, a user IF 804 for inputting an operation of the end user and displaying information for the end user, and a data bus 805 connecting these components. The MPU 801 is a common microprocessor unit and is an example of a processor.

The memory 802 is a primary memory and an example of a storage device. The memory 802 includes an end user device application program 806 and device configuration data 807. The end user device application program 806 is a program module for operating the server application program 401.

The device configuration data 807 stores configuration information and management information unique to the end user device 110. The NIC 803 is a network interface card. The user IF 804 is a module for inputting an operation of the end user and displaying information for the end user.

FIG. 9 illustrates the data configuration of a data storage area for device configuration data 807 in the memory 802. The device configuration data 807 includes a data table "application account list" 901. The data table "application account list" 901 is a list of server application programs to be used by the end user.

Each record of the data table "application account list" 901 has a column "application ID", a column "BC account ID", a column "secret key", and a column "URI". The column "URI" stores the URL of the server application program for the user of the end user device 806 to connect to in order to use the server application program.

As described above, the server and/or the end user device can have a computer configuration. In the computer configuration, the processor executes programs stored in the storage device to work as various function units. In the following description, the sentences having a subject of a program can be replaced with sentences having a subject of a processor or a device including a processor. At least a part of the functions of the server and the end user device can be implemented by an LSI, which is different from a processor. Further, the server and/or the end user device can be implemented by a virtual machine provided by a cloud computing service.

Figure 10:
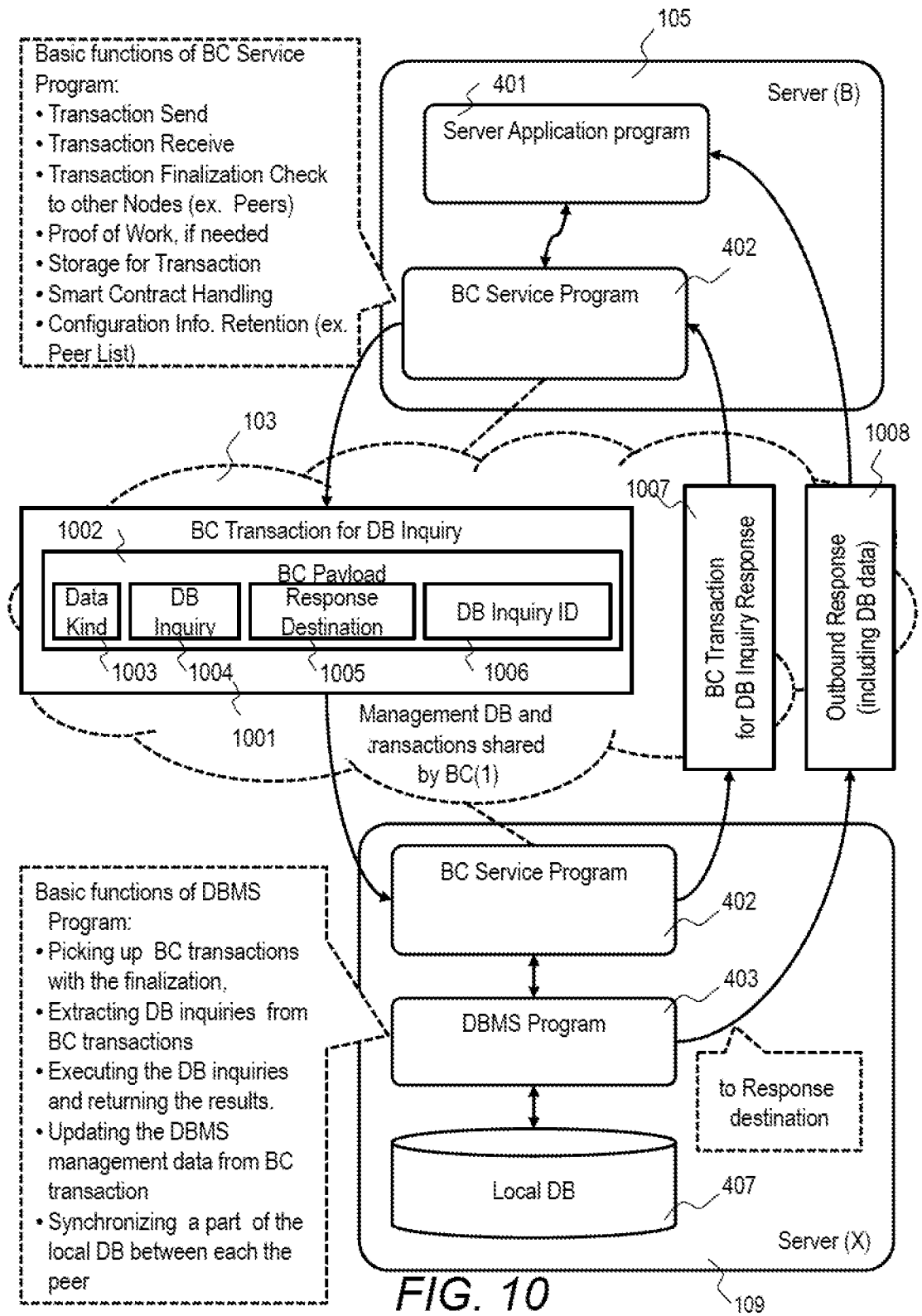
FIG. 10 illustrates the overview of a BC transaction.

The configuration of the system has been described. Next, the principal operation of this system is outlined before describing details of operation flow. FIG. 10 illustrates major data flow when the server application program 401 of the server 105 (second server) accesses data in a database table stored in the local database 407 of the server 109 (first server). In FIG. 10, the rectangles surrounded by dashed lines pointing the BC service program 402 and the DBMS program 403 show the functions of the programs 402 and 403.

In response to a request from the end user device 110, the server application program 401 of the server 105 creates a query for the local database 407 of the server 109. The server application program 401 writes the query to a BC transaction payload for DB inquiry (query storage area) 603 in the server 105 through the BC service program 402 of the server 105.

The BC service programs 402 held by a plurality of servers including the servers 105 and 109 transfer the packets "BC transaction for DB inquiry" 1001 based on the trust relationships 118 and reflect the update of the management DB 406 of the server 105 to the management DBs 406 of the servers having the BC service programs 402. Although this example explains update of storage areas 603 and 604 related to a query, an update of the management DB 406 in any one of the servers is reflected to the management DBs 406 of all servers in the blockchain network.

The DBMS program 403 in each server finds the update of a BC transaction payload for DB inquiry (query storage area) 603 in the management DB 406 and acquires the query information through the BC service program 402 and executes the query.

The DBMS program 403 responds an execution response to the sender of the query indicated in the response destination 607 directly or via the BC service program 402.

For example, the DBMS program 403 determines the way to send the response based on the size of data to be responded. For example, if the data size is equal to or smaller than a predetermined value, the response is transferred to a plurality of servers including the sender of the query through the BC service program 402 (through the blockchain network/protocol) in the form of blockchain network packets 1007. If the data size is larger than the predetermined value, the response is sent in the form of outbound packets 1008 on the Internet 102 without being stored to the shared information storage area.

Figure 11:
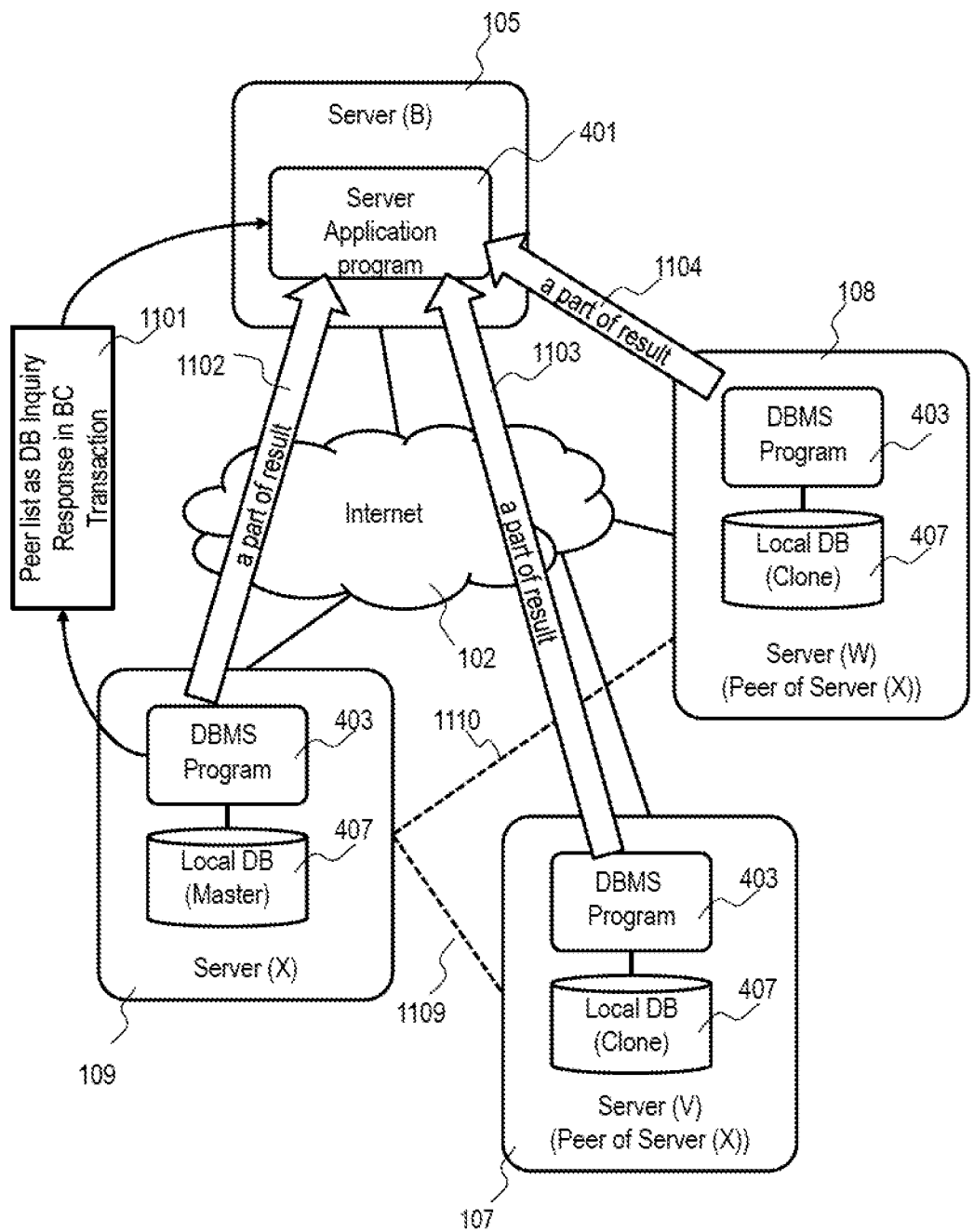
FIG. 11 illustrates a configuration example of collecting a query result.

FIG. 11 illustrates a configuration such that the local DB 407 managed by the DBMS program 403 of the server 109 has clones in other servers. This configuration example is effective when the local DB 407 includes a large number of large data chunks.

The DBMS program 403 of the server 109 operates so that the servers 107 and 108 having trust relationships 1109 and 1110 in the blockchain network will have a clone of the local DB 407. The servers 107 and 108 are all servers listed in the peer list 502 of the server 109. The servers 107 and 108 can be two of the servers in the peer list 502.

When the DBMS program 403 of the server 109 sends an execution result of a query to the server application program 401 of the server 105, the DBMS program 403 includes information on the servers having clones of the local DB 407 in the execution result of the query. In this example, the server 109 includes the peer list 502 of the server 109 in the payload as the execution result. If the servers having a clone of the local DB 407 are a part of the servers in the peer list 502, the DBMS program 403 includes a list of the part of the servers.

As a result, the server application program 401 that has acquired the query response can operate to acquire the query result from the other servers having a clone of the local DB 407 of the server 109 and indicated in the peer list 502 included in the query response. This configuration enables the server application program 401 to acquire the query result from one or more other servers in parallel. Accordingly, high performance is attained by reducing the time to acquire the query result and loosening the limitation of the performance of the IT resources.

Hereinafter, details of operation of the program modules are described.

Figure 12:
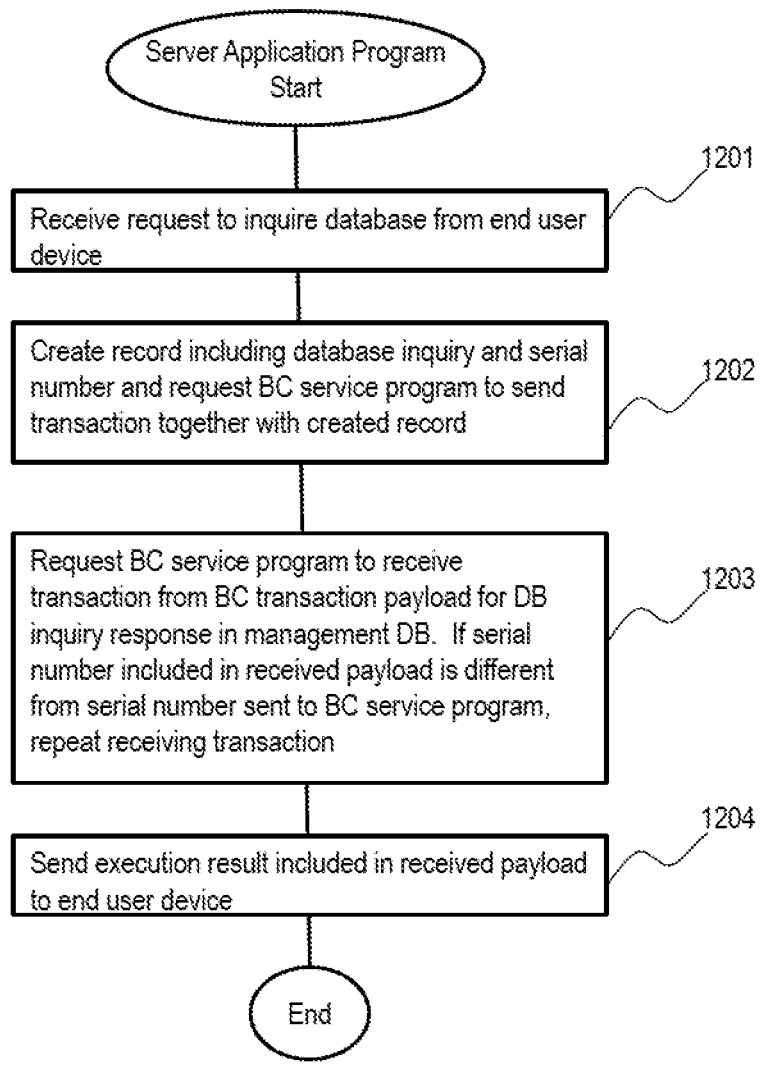
FIG. 12 illustrates operation flow of an example of a server application program.

FIG. 12 illustrates an example of the operation flow of the server application program 401. The server application program 401 first executes the operation block 1201. In the operation block 1201, the server application program 401 receives a request to inquire a database from the end user device 110 and executes the operation block 1202.

In the operation block 1202, the server application program 401 creates a record including the database inquiry and a serial number with reference to the DB table list 601 and requests the BC service program 402 in the same server to send a transaction together with the record. This request to send a transaction is a request to write information to a BC transaction payload for DB inquiry 603 in the management DB 406 of the same server.

Next, the server application program 401 executes the operation block 1203. In the operation block 1203, the server application program 401 requests the BC service program 402 of the same server to receive a transaction from a transaction payload for DB inquiry response 604 of the management DB 406. This request to receive a transaction is a request to acquire a payload 604 (information therein).

If the serial number included in the payload 604 is different from the serial number in the transaction payload for DB inquiry 603 in the transaction requested to be sent, the server application program 401 repeats requesting the DB service program 402 to receive a transaction and executes the operation block 1204.

In the operation block 1204, the server application program 401 sends the execution result stored in the DB transaction payload for DB inquiry response 604 to the end user device 110 and terminates the operation. Through the foregoing operation, the server application program 401 provides database management service to the end user device 110.

Figure 13:
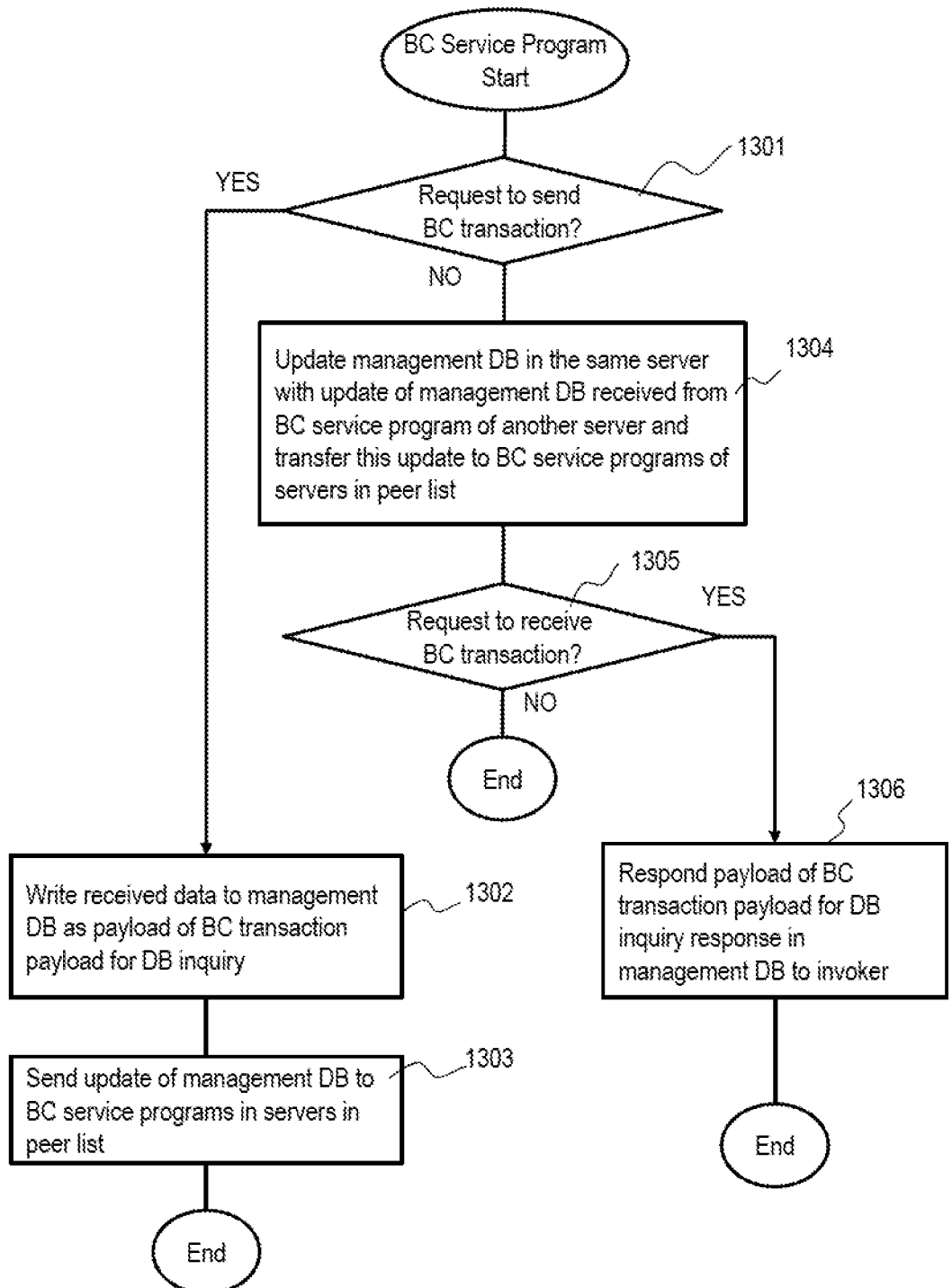
FIG. 13 illustrates operation flow of a BC service program.

FIG. 13 illustrates an example of the operation flow of the BC service program 402. The BC service program 402 first executes the operation block 1301. In the operation block 1301, the BC service program 402 determines whether the received request is a request to send a BC transaction. If it is a request to send a BC transaction, the BC service program 402 executes the operation block 1302. If not, the BC service program 402 executes the operation block 1304.

In the operation block 1302, the BC service program 402 writes the received data to the management DB 406 in the same server as a payload of a BC transaction payload for DB inquiry 603 and executes the operation block 1303. In the operation block 1303, the BC service program 402 sends the update of the management DB 406 in the same server to the BC service programs 402 of all servers in the peer list 502 and terminates the operation.

In the operation block 1304, the BC service program 402 updates the management DB 406 in the same server with the update of the management DB 406 received from the BC service program 402 of another server. The BC service program 402 transfers the update to the BC service programs 402 of the servers in the peer list 502 and executes the operation block 1305. As a result, the update of the management DB 406 is propagated to all servers in the blockchain network through the trust relationships shown in the peer list 502.

In the operation block 1305, the BC service program 402 determines whether the received request is a request to receive a BC transaction. If it is a request to receive a BC transaction, the BC service program 402 executes the operation block 1306. If not, the BC service program 402 exits the flow.

In the operation block 1306, the BC service program 402 responds the payload in the designated BC transaction payload for DB inquiry response 604 in the management DB 406 to the program that has invoked the BC service program 402 and terminates the operation. The BC service program 402 can wait for the designated payload in the management DB 406 to be updated.

Figure 14:
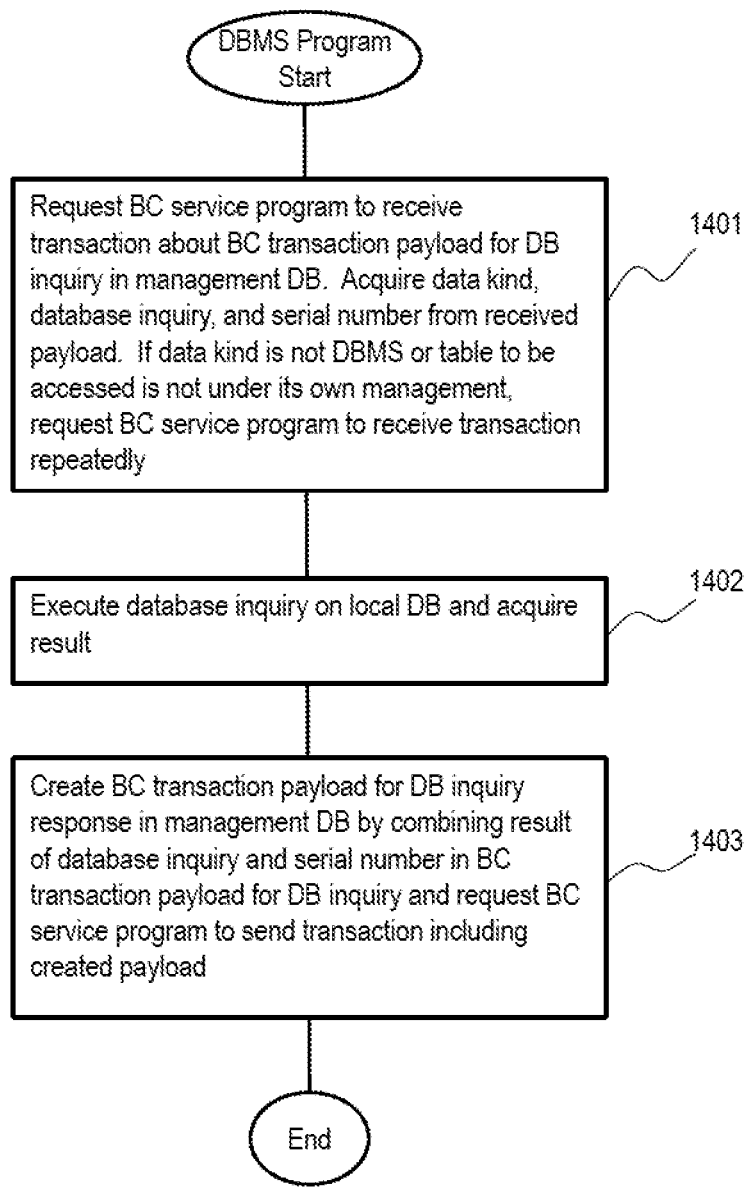
FIG. 14 illustrates operation flow of a DBMS program.

FIG. 14 illustrates an example of the operation flow of the DBMS program 403. The DBMS program 403 first executes the operation block 1401. In the operation block 1401, the DBMS program 403 requests the BC service program 402 in the same server to receive a transaction about a BC transaction payload for DB inquiry 603 in the management DB 406.

The DBMS program 403 acquires the data kind, the database inquiry, and the serial number from the BC transaction payload for DB inquiry 603. If the data kind is not "DBMS", the DBMS program 403 repeats requesting the BC service program 402 to receive a transaction and executes the operation block 1402.

The DBMS program 403 further determines whether the table to be accessed is under its own management with reference to the local account list 503. If the table is not under its own management, the DBMS program 403 repeats requesting the BC service program 402 to receive a transaction and executes the operation block 1402.

In the operation block 1402, the DBMS program 403 executes the acquired database inquiry on the local DB 407, acquires a result, and executes the operation block 1403. In the operation block 1403, the DBMS program 403 creates a payload for a BC transaction payload for DB inquiry response 604 in the management DB 406 by combining the result and the serial number in the BC transaction payload for DB inquiry 603 and requests the BC service program 402 to send a transaction including this payload and terminates the operation.

Figure 15:
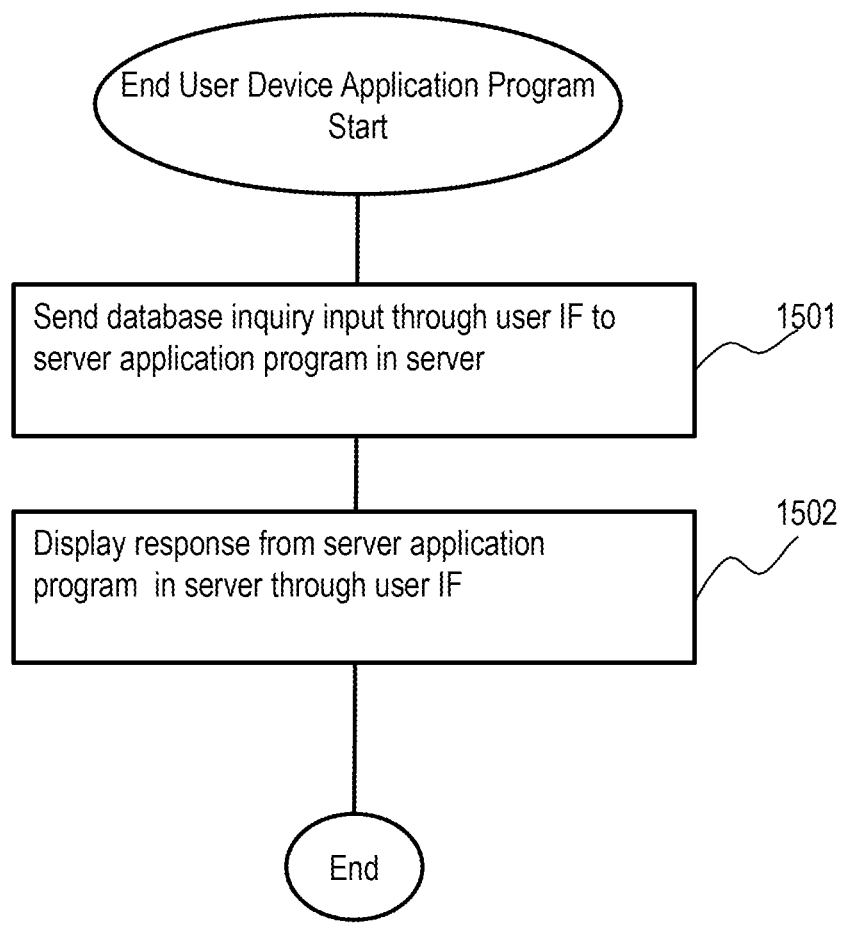
FIG. 15 illustrates operation flow of an end user device application program.

FIG. 15 illustrates the operation flow of the end user device application program 806. The end user device application program 806 first executes the operation block 1501. In the operation block 1501, the end user device application program 806 sends a database inquiry input through the user I/F to the server application program 401 of, for example, the server 105 (accessing DB(X)) and executes the operation block 1502.

In the operation block 1502, the end user device application program 806 displays the response received from the server application program 401 of the server 105 (accessing DB(X)) through the user I/F and terminates the operation.

The configuration and the operation of the system in this embodiment have been described. This embodiment enables a server of an enterprise in a supply chain to access a database in another server participating in a blockchain network by joining the blockchain network. As a result, a program for supporting a server application program does not need to be incorporated in the DBMS program and construction of a system for an enterprise to join a supply chain is facilitated; improvement in business agility is expected.

When large data to be shared by applications scattered across a large number of enterprises is stored in a given local database, accesses to the data are limited by the IT infrastructures (such as the servers, the data storage, and the networks) of individual enterprises. Since the configuration of this embodiment enables data to be stored in a plurality of separate local databases, improvement in the access performance to the shared large data is expected.

The data stored in a local database and a management database can be encrypted or compressed; in that case, a means for decrypting or decompressing the data is necessary before the means for processing the data.

For the DBMS program, a relational database management system (RDBMS) is commonly employed. The query information in that case is expressed in SQL. When Key Value Storage (or Object Storage) employing a representational state transfer interface is employed for the DBMS, the query information can be expressed by a REST application programming interface.

When a web server employing an HTTP protocol is employed for the DBMS program, the query information can be expressed in HyperText Markup Language (HTML). Query information meeting the specification of the employed database management system program can be used.

The accessing the database in this embodiment is applicable to a system different from a supply chain. In any system, this embodiment enables a server to speedily and easily access a database in another server by the server joining a blockchain network. The system can share the information for providing the database management service with a technology different from blockchain technology.

Instead of the BC transaction payload for DB inquiry 603 and the BC transaction payload for DB inquiry response 604, the system can employ a data format of the process control block employed to manage or control processes in a common operating system program.

As a process to execute a query from the server application program 401, the query is shared with other servers through the BC service program 402. The other servers invoke a process for executing the query in accordance with the information in the process control block.

This configuration enables a query to be speedily and easily shared and used by a plurality of servers even if the query is for a program other than the database management system. The term "process" here can be read as "job", "task", or "thread". The term "process control block" can also be read as "event control block" employed in a common network balancer program.

Embodiment 2

Figure 16:
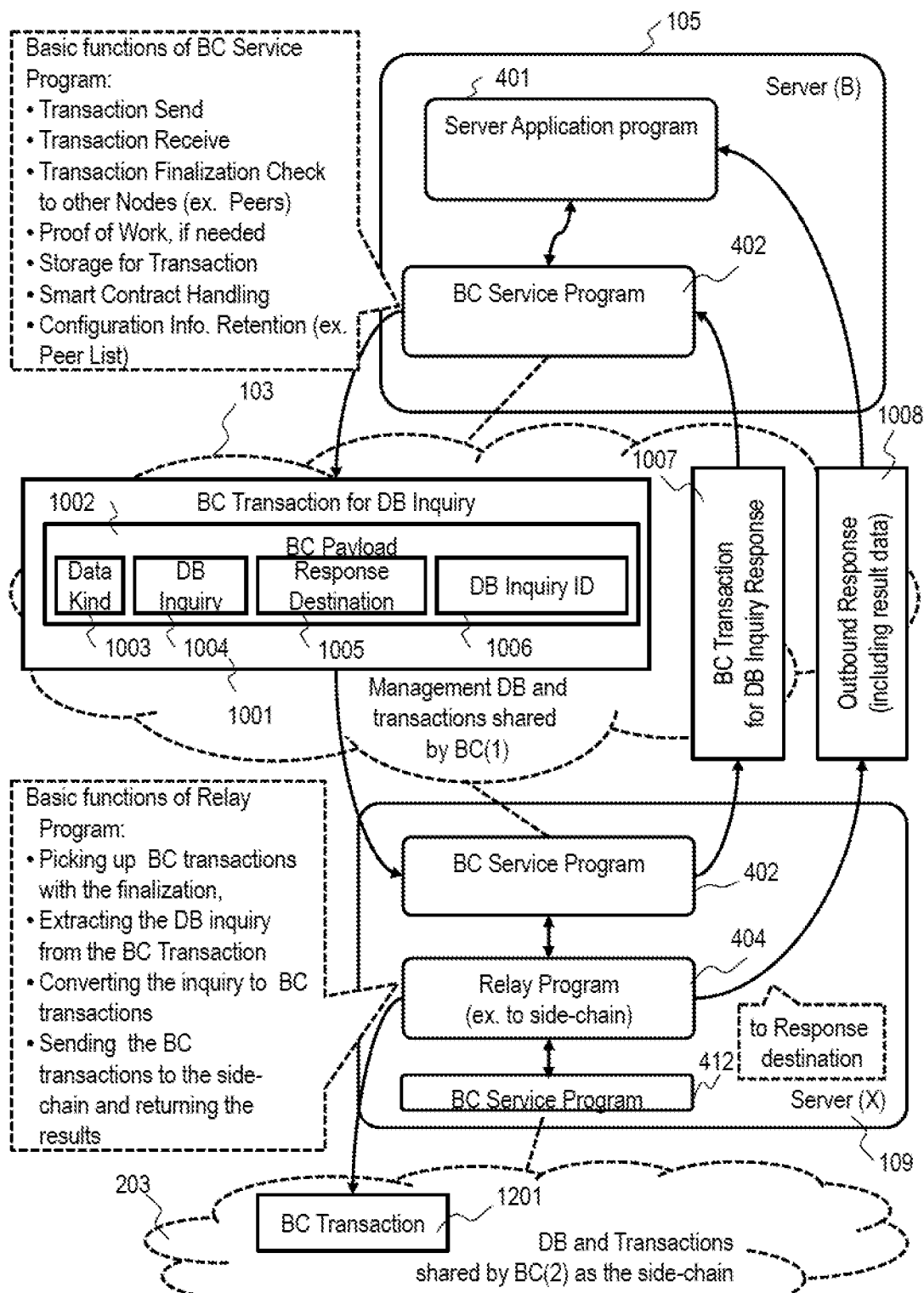
FIG. 16 illustrates the overview of a different kind of BC transaction.

FIG. 16 illustrates an example of the system configuration in Embodiment 2. Unlike the system configuration example in Embodiment 1, the local DB 407 is not managed by the DBMS program 403 but managed by the blockchain platform. FIG. 16 illustrates principal data flow in the system configuration example in this embodiment.

The server 109 in this configuration example is connected with two blockchain networks 103 and 203. In this configuration example, a relay program 404 operates in place of the DBMS program 403 in Embodiment 1. The relay program 404 is a program module for mediating a BC transaction between different blockchain networks. The rectangle surrounded by a dashed line pointing the relay program 404 shows the functions of the relay program 404.

The server 109 has a BC service program 412 for BC transactions in the blockchain network 203 in addition to its configuration in Embodiment 1. Although not shown in FIG. 16, the server 109 has server configuration data 405 and a management DB 406 for each of the blockchain networks 103 and 203. The management DB 406 for the blockchain network 203 is a second shared information storage area. The DB table list 601 is common to the blockchain networks 103 and 203; it includes tables in both of the blockchain networks.

Figure 17:
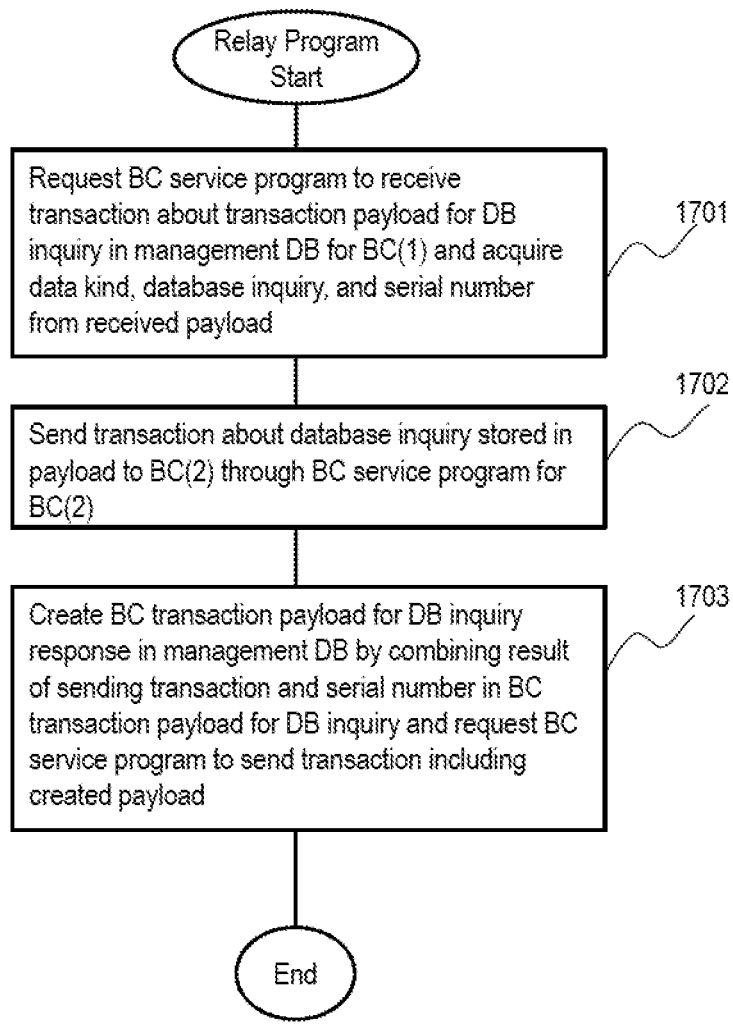
FIG. 17 illustrates operation flow of a relay program.

FIG. 17 illustrates an example of the operation flow of the relay program 404. In this example, a query from the blockchain network 103 requires an access to the local DB in a server (third server) included in the blockchain network 203 and therefore, it is transferred to the blockchain network 203. Furthermore, the query response from the blockchain network 203 is transferred to the blockchain network 103.

The relay program 404 first executes the operation block 1701. In the operation block 1701, the relay program 404 requests the BC service program 402 for the blockchain network 103 to receive a transaction about a BC transaction payload for DB inquiry 603 in the management DB 406.

The relay program 404 acquires the data kind, the database inquiry, and the serial number from the BC transaction payload for DB inquiry 603. The relay program 404 repeats requesting the BC service program 402 to receive a transaction until it acquires information from a BC transaction payload for DB inquiry 603 and executes the operation block 1702.

In the operation block 1702, the relay program 404 transfers the query stored in the BC transaction payload for DB inquiry 603 to the other blockchain network 203 as a BC transaction and executes the operation block 1703.

Specifically, the relay program 404 determines that the table to be accessed is in a local DB in the blockchain network 203 with reference to the DB table list 601. In order to write the acquired query to a BC transaction payload for DB inquiry 603 in the management DB 406 for the blockchain network 203, the relay program 404 requests the BC service program 412 for the blockchain network 203 to send a transaction.

The BC service program 412 sends the update of the management DB 406 to the servers in the peer list 502 for the blockchain network 203.

In the operation block 1703, the relay program 404 requests the BC service program 412 for the blockchain network 203 to receive a BC transaction about a BC transaction payload for DB inquiry response 604 for the blockchain network 203. The relay program 404 acquires the response to the foregoing query (the result of sending the aforementioned transaction).

Further, the relay program 404 creates a record including the result of sending the aforementioned transaction and the serial number included in the BC transaction payload for DB inquiry 603.

The relay program 404 writes the created record to a BC transaction payload for DB inquiry response 604 in the management DB 406 for the blockchain network 103. Specifically, the relay program 404 requests the BC service program 402 for the blockchain network 103 to send a transaction about this record. Thereafter, the relay program 404 terminates the operation.

As described above, in order to share information with a different blockchain network (another information sharing group implemented by a different kind of blockchain technology), this embodiment includes a relay program for converting query information for the application programming interface (API) of a program module employing a different kind of blockchain technology.

This embodiment enables accessing a database in a different blockchain network; improvement in not only agility but also flexibility of system construction is expected. Specifically, to share information in an environment where different kinds of blockchain technology are present, this embodiment allows the server application program to ignore the difference in its operation. The server application program does not need any modification, facilitating application to various works.

It should be noted that this invention is not limited to the above-described embodiments but include various modifications. For example, the above-described embodiments provide details for the sake of better understanding of this invention; they are not limited to those including all the configurations as described. A part of the configuration of an embodiment may be replaced with a configuration of another embodiment or a configuration of an embodiment may be incorporated to a configuration of another embodiment. A part of the configuration of an embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card or an SD card. The drawings show control lines and information lines as considered necessary for explanations but do not show all control lines or information lines in the products. It can be considered that most of all components are actually interconnected.

What is claimed is:

1. A database management service provision system comprising:
   a plurality of servers; and
   one or more databases,
   wherein the plurality of servers include:
      a first server; and
      a second server,
   wherein each of the plurality of servers includes a shared information storage area configured to store information to be shared with other servers,
   wherein each of the plurality of servers is configured to operate to have identical data in the shared information storage area,
   wherein the first server is configured to manage a first local database,
   wherein the second server is configured to:
      generate first query information to access the first local database; and
      store the first query information to the shared information storage area of the second server,
   wherein the first server is configured to:
      acquire the first query information from the shared information storage area of the first server; and
      store a response to the first query information to the shared information storage area of the first server, and
   wherein the second server is configured to acquire the response from the shared information storage area of the second server,
   wherein the shared information storage area is a first shared information storage area,
   wherein the first server is also included in a second database management service provision system different from the database management service provision system and has a second shared information storage area configured to store information to be shared with other servers in the second database management service provision system, and
   wherein the first server is configured to:
      acquire second query information for a second local database managed by a third server included in the second database management service provision system from the first shared information storage area of the first server;
      store the second query information to the second shared information storage area of the first server;
      acquire a response to the second query information from the second shared information storage area of the first server; and
      store the response to the second query information to the first shared information storage area of the first server.

2. The database management service provision system according to claim 1, wherein the shared information storage area is configured to store information on a plurality of databases managed by the plurality of servers.

3. The database management service provision system according to claim 1,
   wherein each of the plurality of servers retains a list of other servers for communication among the plurality of servers, and
   wherein each of the plurality of servers is configured to send an update of the shared information storage area to the other servers indicated in the list.

4. The database management service provision system according to claim 1, wherein the second server is configured to:
   generate the first query information in response to an instruction from an end user device; and
   send the response acquired from the shared information storage area of the second server to the end user device.

5. The database management service provision system according to claim 1, wherein the first server is configured to:
   acquire third query information for the first local database from the shared information storage area of the first server, the third query information including information on where to send a query response; and
   send a response to the third query information to a server indicated in the information on where to send the query response without storing the response to the third query information to the shared information storage area of the first server.

6. The database management service provision system according to claim 1,
   wherein one or more servers different from the first server in the plurality of servers are configured to manage clones of the first local database, and
   wherein the first server is configured to:
      acquire third query information for the first local database from the shared information storage area of the first server; and
      store a response to the third query information including information on the one or more servers to the shared information storage area of the first server.

7. A method to be executed by a system including a plurality of servers and one or more databases,
   the plurality of servers including a first server and a second server,
   each of the plurality of servers having a shared information storage area configured to store information to be shared with other servers,
   each of the plurality of servers being configured to operate to have identical data in the shared information storage, and
   the method comprising:
      managing, by the first server, a first local database;
      generating, by the second server, first query information to access the first local database;
      storing, by the second server, the first query information to the shared information storage area of the second server;
      acquiring, by the first server, the first query information from the shared information storage area of the first server;
      storing, by the first server, a response to the first query information to the shared information storage area of the first server; and
      acquiring, by the second server, the response from the shared information storage area of the second server, wherein the shared information storage area is a first shared information storage area, wherein the first server is also included in a second database management service provision system different from the database management service provision system and has a second shared information storage area configured to store information to be shared with other servers in the second database management service provision system, and wherein the first server is configured to:

acquire second query information for a second local database managed by a third server included in the second database management service provision system from the first shared information storage area of the first server;

store the second query information to the second shared information storage area of the first server;

acquire a response to the second query information from the second shared information storage area of the first server; and store the response to the second query information to the first shared information storage area of the first server.

8. The database management service provision system according to claim 1, wherein the response is transferred to a plurality of servers including a sender of a query as blockchain network packets when a data size of the response is equal to or smaller than a predetermined value, but the response is sent as outbound packets via Internet without being stored to the shared information storage area when the data size of the response is larger than the predetermined value.

9. The database management service provision system according to claim 3, wherein the response is acquired in parallel from the other servers.

* * * * *